Figure 1:
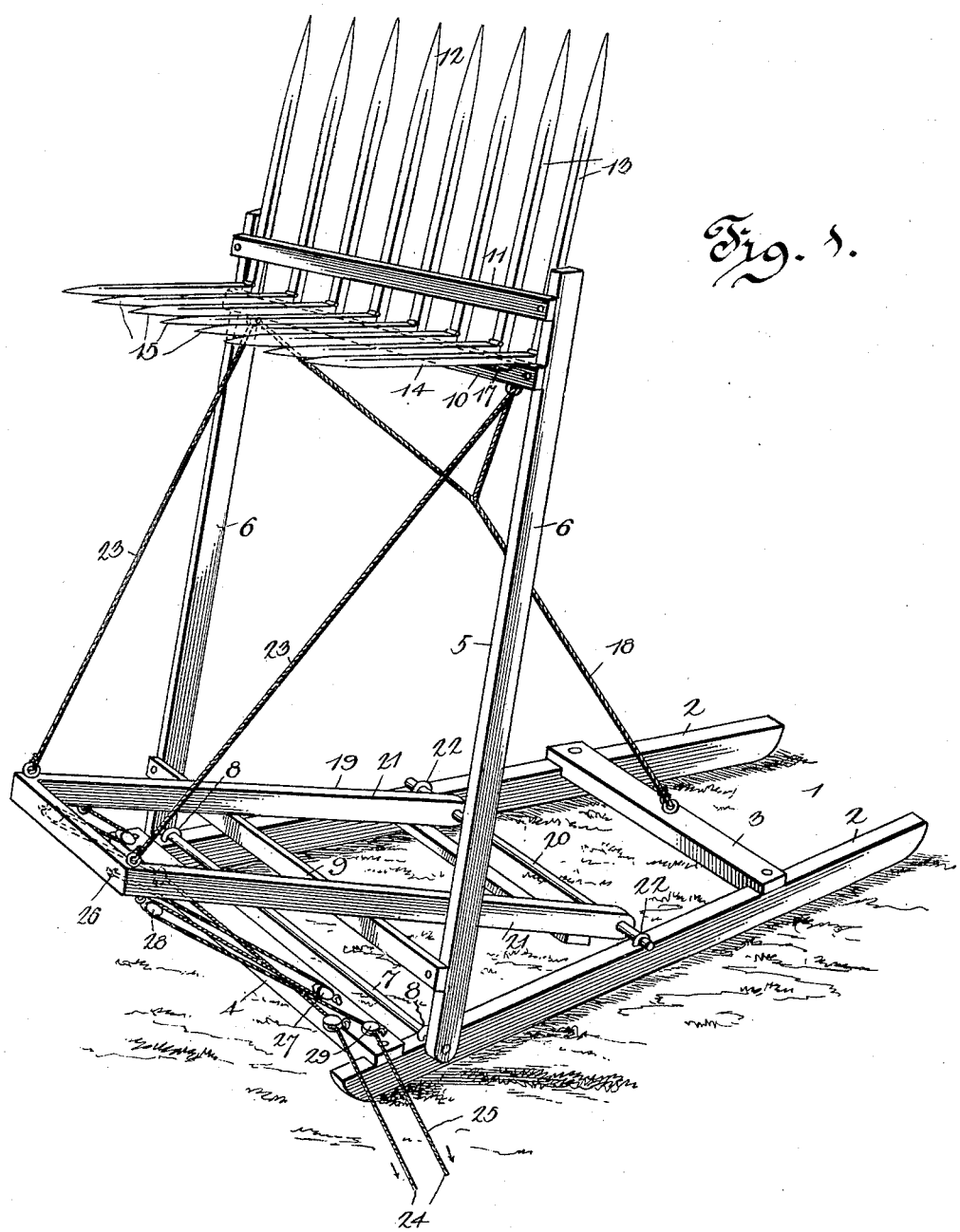

No. 700,905. Patented May 27, 1902.
S. C. DUNHAM.
HAY STACKER.
(Application filed Oct. 13, 1900.)
(No Model.) 2 Sheets—Sheet 1.

Witnesses  Sylvester C. Dunham, Inventor,

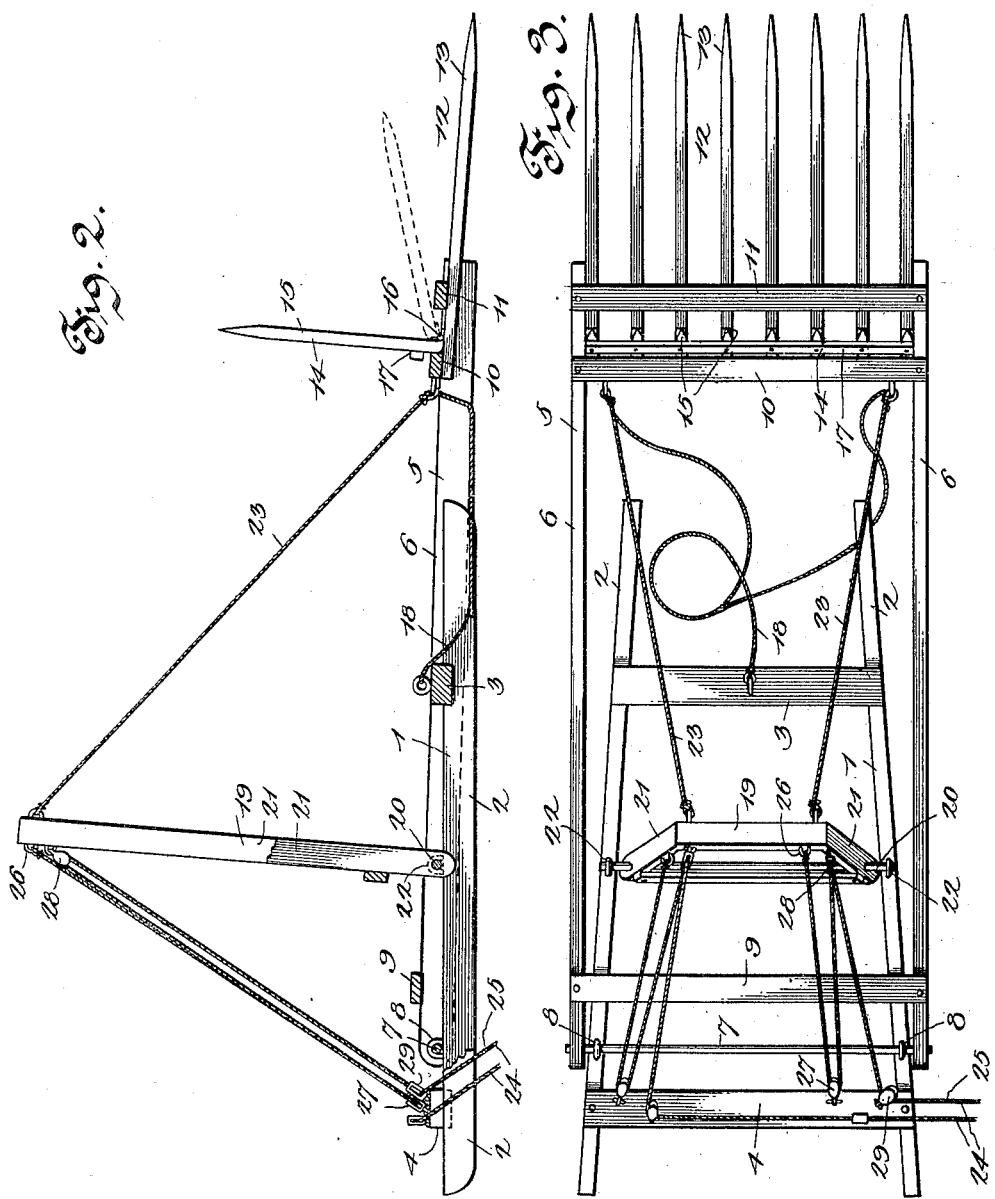

UNITED STATES PATENT OFFICE.

SYLVESTER C. DUNHAM, OF VAIL, IOWA.

HAY-STACKER.

SPECIFICATION forming part of Letters Patent No. 700,905, dated May 27, 1902.

Application filed October 13, 1900. Serial No. 32,995. (No model.)

*To all whom it may concern:*

Be it known that I, SYLVESTER C. DUNHAM, a citizen of the United States, residing at Vail, in the county of Crawford and State of Iowa, have invented a new and useful Hay-Stacker, of which the following is a specification.

My invention is an improved hay-stacker; and it consists in the peculiar construction and combination of devices hereinafter fully set forth, and pointed out in the claim.

The object of my invention is to provide a hay-stacker which is extremely simple in construction, is cheap, is adapted to be readily moved from one point to another, and is thoroughly efficient in operation.

In the accompanying drawings, Figure 1 is a perspective view of a hay-stacker embodying my improvements, showing the fork raised. Fig. 2 is partly a side elevation and partly a longitudinal sectional view of the same, showing the fork lowered and the rocking frame raised. Fig. 3 is a top plan view of the same.

The ground-frame 1 is composed of a pair of sills or runners 2 and a pair of cross-bars 3 and 4, which are located near opposite ends of the sills or runners. The latter are disposed on converging lines, so that the ground-frame is wider at one end than at the other.

The fork-frame 5 has its side bars 6 pivotally connected to the ground-frame near the widened end of the latter on the shaft 7, which is in bearings 8. The bars 6 are connected together near their inner pivoted ends by a cross-bar 9 and are connected together near their outer free ends by a pair of cross-bars 10 11. The fork 12 is carried by the outer end of the frame 5 and comprises the fixed tines or fingers 13, the inner ends of which are secured under the cross-bars 10 11, and the pivoted head 14, which comprises the fingers 15, hinged on the fingers 13, as at 16, and connected together by the cross-bar 17. Thereby the said head is adapted to turn on the fork, as will be understood and as shown in Fig. 2 of the drawings, in which one position of the head is shown in full lines and the other extreme position thereof is indicated by dotted lines. A guy-rope 18 connects the outer end of the fork-frame to the cross-bar 3 of the ground-frame.

A rocking frame 19 is pivotally mounted at its inner end on the center of the ground-frame 1, a shaft 20, which passes through the inner ends of the side bars 21 of said rocking frame being journaled in bearings 22 on the ground-frame. The outer end of the rocking frame is connected to the fork-frame by ropes 23, and tackles 24 connect the outer end of the rocking frame to the cross-bar 4 of the ground-frame. Each of the tackles 24 comprises a hoisting-rope 25, which is attached to the rocking frame, as at 26, passes over a block 27, secured on the cross-bar 4, then passes over a block 28, secured to the hoisting-frame, and then passes over the block 29, secured on the said cross-bar 4, the outer end of the said hoisting-rope being adapted to have a doubletree or singletree attached thereto in the usual manner, so that the hoisting-rope may be operated by a horse or team of horses.

In the operation of my invention the draft on the hoisting-ropes causes the rocking frame 19 to be lowered, thereby, through the ropes 23, raising the outer end of the fork-frame, and hence elevating the fork and the load of hay thereon. The guy-rope 18 is of such length as to limit the movement of the fork-frame, and when the fork has been raised to a suitable elevation the load of hay is discharged by gravity from the fork, as will be understood. It will be observed by reference to Figs. 1 and 2 of the drawings that the length of the guy-rope is such that it arrests the fork-frame just before the latter reaches a vertical position, and hence when the load has been discharged from the fork and the horse or team backed, so as to slacken the hoisting-ropes, the fork by gravity redescends to its initial position.

By having the ground-frame wider at its inner end than at its outer end spaces are left between the said ground-frame and the fork-frame when the latter is lowered to the ground, as is shown in Fig. 3, which spaces are of such width that loose hay is prevented from wedging in them between the fork-frame and the ground-frame and retarding or preventing the elevation of the fork-frame, and hence I obviate an objection heretofore existing in machines of this class.

Having thus described my invention, I claim—

A hay-stacker comprising a ground-frame composed of a pair of runners disposed on converging lines, cross-bars rigidly connecting the runners, a shaft mounted in bearings on the upper sides of the runners at the wide end thereof, a fork-frame secured to the shaft on the outer sides of the runners and provided at its upper end with a fork comprising fixed and movable tines, a guy-rope secured to the center portion of the ground-frame and to the fork-frame, a shaft mounted in bearings in the upper sides of the runners near the center thereof, a rocking frame carried by the shaft and disposed on the inner sides of the runners and of the fork-frame, a cross-bar carried by the fork-frame on which the said rocking frame is adapted to bear, ropes secured to the opposite side portions of the front end of the rocking frame and the upper portion of the fork-frame, and operating-ropes having their ends secured to the upper portion of the rocking frame and extended laterally from one side of the front end of the ground-frame and passed alternately through pulleys on the front end of the latter frame and the upper end of the rocking frame, substantially as and for the purpose specified.

In testimony that I claim the foregoing as my own I have hereto affixed my signature in the presence of two witnesses.

SYLVESTER C. DUNHAM.

Witnesses:
TRACY CHAPMAN,
W. F. SHOVE.